US007341677B2

(12) United States Patent
Yu et al.

(10) Patent No.: US 7,341,677 B2
(45) Date of Patent: *Mar. 11, 2008

(54) NON-CARCINOGENIC CORROSION INHIBITING ADDITIVE

(75) Inventors: Xiaomei Yu, Glastonbury, CT (US); Weilong Zhang, Glastonbury, CT (US); Thomas Garosshen, Glastonbury, CT (US); Promila Bhatia, Bristol, CT (US); Mark Jaworowski, Glastonbury, CT (US); Foster Lamm, South Windsor, CT (US); Xia Tang, West Hartford, CT (US); Amy Besing, Manchester, CT (US); Mike A. Kryzman, West Hartford, CT (US); Xiaoyuan Chang, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 511 days.

This patent is subject to a terminal disclaimer.

(21) Appl. No.: 10/611,047

(22) Filed: Jun. 30, 2003

(65) Prior Publication Data

US 2004/0262580 A1    Dec. 30, 2004

(51) Int. Cl.
C23F 11/08    (2006.01)
C23F 11/10    (2006.01)
C23F 11/18    (2006.01)

(52) U.S. Cl. .............................. 252/389.1; 252/389.23; 252/389.52; 252/389.54; 106/14.11; 106/14.12; 106/14.13; 106/14.14; 106/14.34; 106/14.35; 106/14.36; 106/14.21; 148/250; 148/252; 148/253; 148/254; 148/261

(58) Field of Classification Search ................ 428/418, 428/457–478.2; 148/250, 252, 253, 254, 148/261; 106/14.11–14.14, 14.21, 14.34, 106/14.35, 14.36; 523/451, 454, 456, 458–460; 524/381, 382, 398, 399; 252/389.1, 389.23, 252/389.52, 389.54
See application file for complete search history.

(56) References Cited

U.S. PATENT DOCUMENTS

| 2,387,528 A | 10/1945 | Patterson et al. |
| 2,430,589 A | 11/1947 | Sloan |
| 2,902,394 A | 9/1959 | Jeremias |
| 3,063,877 A | 11/1962 | Schiffman |
| 3,279,958 A | 10/1966 | Maurer et al. |
| 4,138,353 A | 2/1979 | Lipinski |

(Continued)

FOREIGN PATENT DOCUMENTS

CA    2 392 317    5/2001

(Continued)

OTHER PUBLICATIONS

Grant, Julius, Ed., "Hackh's Chemical Dictionary" (Fourth edition, 1972) McGraw-Hill (New York), p. 144 "cerous citrate".*

(Continued)

Primary Examiner—Joseph D. Anthony
(74) Attorney, Agent, or Firm—Bachman & LaPointe, P.C.

(57) ABSTRACT

A non-carcinogenic corrosion inhibiting additive includes an anodic corrosion inhibitor and/or a cathodic corrosion inhibitor and a solubility enhancer for the inhibitors in the form of a metal complexing agent.

8 Claims, 1 Drawing Sheet

SPECIMEN III
PRESENT INVENTION
epoxy primer
2000 hours

SPECIMEN I
Blank epoxy primer
200 hours

SPECIMEN II
SrCrO₄ epoxy primer
(hexavalent chromium)
2000 hours

U.S. PATENT DOCUMENTS

| | | | |
|---|---|---|---|
| 5,030,285 A | | 7/1991 | Vallvey et al. |
| 5,130,052 A | * | 7/1992 | Kreh et al. ............... 252/387 |
| 5,322,560 A | * | 6/1994 | DePue et al. ............. 106/404 |
| 5,531,931 A | | 7/1996 | Koefod |
| 5,948,147 A | * | 9/1999 | Sinko ..................... 106/14.05 |
| 6,139,610 A | | 10/2000 | Sinko |
| 6,156,226 A | * | 12/2000 | Klyosov et al. ............. 252/70 |
| 6,537,678 B1 | | 3/2003 | Putnam et al. |
| 6,582,530 B1 | * | 6/2003 | Hanlon et al. ............. 148/262 |
| 6,758,887 B2 | * | 7/2004 | Bhatia ..................... 106/14.44 |

FOREIGN PATENT DOCUMENTS

| | | |
|---|---|---|
| EP | 0 085 562 | 8/1983 |
| EP | 0 244 180 | 11/1987 |
| EP | 0 429 180 | 5/1991 |
| EP | 1 191 073 | 3/2002 |
| EP | 1 217 094 | 6/2002 |

OTHER PUBLICATIONS

An article entitled "Metal Chelates of Citric Acid . . . ", By Muller et al., published by Corrosion Science, vol. 39, No. 8, pp. 1481-1485, (1997).

An article entitled "Molybdate in Aqueous Corrosion Inhibition . . . ", By Farr et al., published by Surface Technology, vol. 17, pp. 19-27, (1982).

Smith et al., "Development of chromate-free treatments for protection of aerospace aluminum alloys", ATM Metallurgie (1997), 37(2-3-4), 266-73.

* cited by examiner

SPECIMEN III
PRESENT INVENTION
epoxy primer
2000 hours

SPECIMEN I
Blank epoxy primer 200 hours

SPECIMEN II
SrCrO$_4$ epoxy primer
(hexavalent chromium)
2000 hours

NON-CARCINOGENIC CORROSION INHIBITING ADDITIVE

BACKGROUND OF THE INVENTION

The present invention relates to a corrosion inhibiting additive and, more particularly, a corrosion inhibiting additive which is as effective as hexavalent chromium compounds but which do not have the health hazards associated with hexavalent chromium compounds.

Corrosion inhibitive compounds have long been used on, for example, metallic surfaces to inhibit corrosion thereof. U.S. Pat. No. 2,387,528 describes alkali earth metal chromates containing trivalent as well as hexavalent chromium as additives for metal protective pigments. U.S. Pat. No. 2,430,589 describes protective pigments comprising calcium chromate associated with minor additions of ferric, manganic or chromic oxides. U.S. Pat. No. 2,902,394 describes the use of soluble chromium containing compounds used in aqueous metal treating or rinsing solutions applied to metal surfaces or to the conversion coating onto metal surfaces to improve corrosion resistance. U.S. Pat. No. 3,063,877 describes aqueous solutions for treating metal surfaces to, in part, improve corrosion resistance, which are prepared by partially reducing a dissolved hexavalent chromium compound with formaldehyde. U.S. Pat. No. 3,279,958 describes rinsing of phosphate, chromate and other chemical conversion coatings on metal surfaces with a dilute aqueous acid solution of a chromium chromate complex followed by a water rinse. The complex is prepared by treating aqueous chromic acid solution with an organic reducing agent to reduce a portion of the hexavalent chromium to the trivalent state.

In the aerospace industry, aluminum alloys achieve their high strength to weight ratio by inclusion of such additional elements as copper, silicon, chromium, manganese, zinc and magnesium. The presence of these elements in high strength aluminum alloys make them more susceptible to corrosion attack than pure aluminum. These high strength aluminum alloys are, therefore, generally protected in service by use of corrosion inhibitive compounds based on hexavalent chromium. These compounds include barium or strontium chromate particles used as inhibitive pigments and adhesives, paints and primers; chromic acid, which is used to produce a chromium rich conversion coating; and sodium and potassium dichromate, which are used as sealing compounds for anodized films.

All forms of hexavalent chromium are recognized by the United States National Institute of Environmental Health Sciences as a Group 1 known human carcinogen. Accordingly, the use of corrosion inhibiting compounds which contain forms of hexavalent chromium are subject to stringent regulation and control. It would be very beneficial to eliminate hexavalent chromium as a corrosion inhibiting additive to corrosion inhibitive compounds as described above.

U.S. Pat. No. 5,030,285 describes a substitute corrosion inhibiting pigment for hexavalent chromium compounds. The corrosion inhibiting additive includes a combination of ferric phosphate and ferrous phosphate. While the proposed corrosive inhibiting additive does not suffer from the possible health problems associated hexavalent chromium compounds, it has not proved to be particularly effective in inhibiting corrosion, particularly of metals, when used as an additive in inhibitive pigments in adhesives, paints and primers, or as a conversion coating.

U.S. Pat. No. 6,537,678 discloses a non-carcinogenic corrosion inhibiting additive comprising an anodic corrosion inhibitor and a cathodic corrosion inhibitor. The inhibiting additive provides protection against both localized and general corrosion. While the corrosion inhibiting additive is effective and does not suffer from the health problems associated with hexavelant chromium compounds, it has been found that the performance of anodic and cathodic corrosion inhibitor used in the inhibiting additive is limited by the solubility of the anodic and cathodic corrosion inhibitors.

Naturally, it would be highly desirable to provide corrosion inhibitors which can be used and substituted for hexavalent chromium inhibitors so as to avoid potential health hazards while at the same time provide effective corrosion protection on metal surfaces, particularly, high strength aluminum alloys used in aerospace applications.

Accordingly, it is the principle object of the present invention to provide a corrosion inhibiting additive which is non-carcinogenic.

It is a particular object of the present invention to provide a corrosion inhibiting additive as set forth above which is effective in preventing corrosion attack on metals.

It is a further object of the present invention to provide a corrosion inhibiting additive as set forth above which is particularly effective when applied to high strength aluminum alloys.

It is a still further object of the present invention to provide a corrosion inhibiting additive as set forth above which is effective against both general corrosion and pitting corrosion.

Further objects and advantages of the present invention will appear hereinbelow.

SUMMARY OF THE INVENTION

In accordance with the present invention, the foregoing objections and advantages are readily obtained.

The present invention is drawn to a non-carcinogenic corrosion inhibiting additive comprising at least one of an anodic corrosion inhibitor and cathodic corrosion inhibitor in combination with a metal complexing agent which increases the solubility of the corrosion inhibiting additive. Preferably, the inhibiting additive comprises a combination of an anodic corrosion inhibitor and a cathodic corrosion inhibitor. The inhibiting additive of the present invention provides protection against both localized pitting corrosion and general corrosion.

The metal complexing agent is selected from the group consisting of water soluble organic acid salt, water soluble inorganic acid salts and mixtures thereof. The cathodic corrosion inhibitor is selected from the group consisting of rare earth metals, rare earth metal compounds and the anodic corrosion inhibitor is selected from the group consisting of transition metal salts. The metal complexing agent increases the solubility of the anodic and cathodic corrosion inhibiting additives.

The corrosion inhibiting additive of the present invention may be used as an inhibitive additive in adhesives, paints and primers, organic sealants, epoxies and the like, which are thereafter applied to a substrate by mechanical methods known in the art or dissolved in solution and applied to a substrate as a conversion coating.

DETAILED DESCRIPTION

Figure 1A:
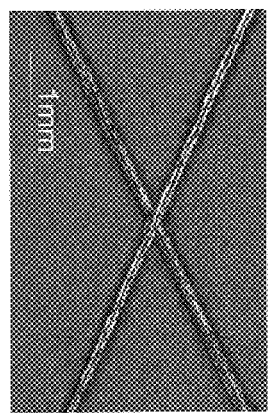
FIG. 1a is a corrosion test coupon comprising a metal substrate having a coating including a metal complexing agent in accordance with the present invention.

The present invention is drawn to a non-carcinogenic corrosion inhibiting additive and, more particularly, a non-carcinogenic corrosion inhibiting additive which is effective against general corrosion and pitting corrosion.

In accordance with the present invention, the non-carcinogenic corrosion inhibiting additive comprises, in combination, an anodic corrosion inhibitor and a cathodic corrosion inhibitor. By anodic corrosion inhibitor is meant suppression of metal oxidation reactions. By cathodic corrosion inhibitor is meant suppression of reduction reactions. In order to be effective, both the anodic and cathodic corrosion inhibitors should be "strong" corrosion inhibitors. By strong anodic corrosion inhibitor is meant a compound that is soluble in alkaline media, while precipitating as a reduced, insoluble oxide under neutral and acidic reducing conditions, that is, existing as an insoluble oxide below −600 mv vs Ag/AgCl at pH 7, and below −300 mv vs Ag/AgCl at pH 2. By a strong cathodic corrosion inhibitor is meant a compound that is soluble in acidic media, while undergoing a valance change to precipitate as an insoluble oxide under neutral and alkaline and moderately oxidizing conditions, that is, existing as an insoluble oxide above −300 mv vs Ag/AgCl at pH 7, and above −900 mv vs Ag/AgCl at pH 12. The corrosion inhibiting additive requires both an anodic corrosion inhibitor and a cathodic corrosion inhibitor in order to be effective against general corrosion and pitting corrosion. General corrosion means uniform dissolution of base metal. By pitting corrosion is meant localized corrosion of metal resulting in the formation of corrosion pits. The anodic corrosion inhibitor is effective against general corrosion while the cathodic corrosion inhibitor is particularly effective against pitting corrosion.

Suitable cathodic corrosion inhibitors for use in the inhibiting additive of the present invention include rare earth metal compounds, particularly metal salts of the elements of Group IIIB of the Periodic Table (the CAS version). All of the foregoing elements have cathodic corrosion inhibiting characteristics; however, it has been found that cerium, neodymium and praseodymium are "strong" cathodic corrosion inhibitors as defined above and are therefore preferred Group IIIB elements. Particularly preferred cathodic corrosion inhibitors are compounds of cerium and, most preferred are cerous compounds. Suitable anodic corrosion inhibitors for use in the inhibiting additive of the present invention include transition element metal salts, preferably of elements from Groups VB and VIB of the Periodic Table, with the exception of hexavalent chromium, and more particularly include compounds of vanadium, molybdenum and tungsten and more particularly tungstate combined with molybdate compounds.

In accordance with the present invention a metal complexing agent is used in combination with the above described anodic and cathodic corrosion inhibitors. The metal complexing agent is preferably a water soluble organic acid salt and/or a water soluble inorganic acid salt. Particularly useful metal complexing agents are selected from the group consisting of citrate, gluconate, polyphosphate, tartrate, β-diketonates, α-hydroxy acids, D-fructose, L-sorbose and mixtures. The metal complexing agent should be present in an amount of between 0.1 to 1.0, preferably between 0.3 to 0.7 with respect to the mole fraction of the combined anodic and cathodic corrosion inhibitor.

Preferred additives which are non-carcinogenic, effect against corrosion and exhibit excellent solubility include, for example, cerium citrate; cerium citrate with zinc molybdate, zinc oxide, and strontium tungstate; cerium citrate with molybdenum oxide and strontium tungstate, and mixtures thereof.

The corrosion inhibiting additive of the present invention may be added as an inhibitive pigment in adhesives, paints and primers, organic sealants, epoxies and the like (hereafter referred to as an organic carrier). These products may be applied to the substrate which is being protected by any suitable manner known in the art such as spraying, brushing, or the like. In addition, the corrosion inhibiting additive, whose solubility is increased by the metal complexing agent, is dissolved in a carrier such as alcohol, water or the like and formed on the surface of a substrate as a conversion coating. In either case, that is, as an additive to adhesive, paints and primers, epoxies and the like, or as an additive to a solution for conversion coating, the corrosion inhibiting additive is provided in a solution comprising a carrier and the corrosion inhibiting additive. In the first case described above with regard to paints and primers, etc., the carrier may be at least an organic binder. When the corrosion inhibiting additive is to be applied by conversion coating, the carrier may simply be, for example, water or alcohol. Solutions for conversion coatings and compounds used as adhesives, paints and primers, and epoxies and their preparation are well-known in the art as evidenced by the above-referenced patents referred to in the background of the invention which are incorporated herein by reference.

When the corrosion inhibiting additive is used as an additive to solutions such as adhesives, paints and primers, sealants, epoxies and the like (herein referred to as organic carriers), it is preferred that the additive be present in an amount of between about 5 to 12 vol. % and the minimum amount of anodic corrosion inhibitor plus cathodic corrosion inhibitor is at least 1 vol. % and the metal complexing agent is present in at least 0.1 mole fraction of combined inhibitor. It is preferred that molar solubility in water of the anodic corrosion inhibitor and the cathodic corrosion inhibitor lie between $1E^{-6}$ and $1E^{-4}$ mol/liter.

When the corrosion inhibiting additive is dissolved in solution with a carrier, such as alcohol or water, and applied to a substrate as a conversion coating, it is preferred that the additive be present in an amount of between about 100 to 300 mg/ft$^2$ and wherein the minimum amount of combined anodic corrosion inhibitor and cathodic corrosion inhibitor is at least 50 mg/ft$^2$ and the metal complexing agent is present in an amount of at least 0.1 mole fraction of combined inhibitors. The concentration of the anodic corrosion inhibitor and cathodic corrosion inhibitor in the carrier should be between 0.1 and 100 grams/liter, preferably between 1 and 10 grams/liter and the metal complexing agent between 0.05 to 50 grams/liter, preferably 0.5 to 5 grams/liter. When the corrosion inhibiting additive is dissolved with a carrier for use in water circulation systems such as boiler feed systems, radiator fluid systems, and the like, the concentration of the anodic corrosion inhibitor and the cathodic corrosion inhibitor in the carrier should be between 1 ppm and 1000 ppm, preferably between 10 ppm and 500 ppm while the metal complexing agent is present in an amount of 0.5 to 500, preferably 5 to 300.

The corrosion inhibiting additive is particularly useful in preventing general corrosion and pitting corrosion on metal substrates, particularly, high strength aluminum alloys for use in the aerospace industry. The additive may be applied in any manner known in the art including as a conversion coating, or applied as a primer, adhesive, epoxy, paint, organic sealant, sealer for anodized aluminum, additive for recirculating water system or the like obviously the use of the corrosion inhibiting additive of the present invention extends to other fields outside of aerospace and includes automotive, architectural, packaging, electronics, HVAC and marine.

The final product is an article comprising a metal substrate having a corrosion inhibiting coating having a corrosion inhibiting additive, which comprises at least one of an anodic corrosion inhibitor, a cathodic corrosion inhibitor and a metal complexing agent on the final product wherein the anodic and/or cathodic corrosion inhibitor is present between 1 wt. % to 50 wt. % and the metal complexing agent is present between 0.1 and 1.0 mole fraction of combined inhibitors. When the corrosion inhibiting additive is applied as a conversion coating on the metal substrate, it is preferred that the coating have a coating weight of at least 50 mg/ft$^2$, preferably between 100 and 500 mg/ft$^2$, and the anodic and/or cathodic corrosion inhibitor be present in an amount of between 60 to 200 mg/ft$^2$ and the metal complexing agent in an amount of 40 to 300 mg/ft$^2$, respectively. When the corrosion inhibitive additive is incorporated into an organic carrier (as described above) and applied to the metal substrate by mechanical methods known in the art, the coating should have a thickness of at least 2.5 microns, preferably between 2.5 and 250 microns, and the anodic plus cathodic corrosion inhibitor be present in an amount of between 5 vol. % to 12 vol. % and the metal complexing agent in an amount of 0.1 to 1.0 mole fraction of combined inhibitor.

The corrosion inhibiting properties of the additive of the present invention will now be made clear from the following example.

EXAMPLE

Three specimens were prepared for corrosion test. Specimen I was a blank coupon having no corrosion inhibiting additive, Specimen II was a coupon having a hexavalent chromium additive and Specimen III was a coupon with the additive according the present invention. Each pigment additive was ground to a <5 μm particle size. Inhibitor pigments were weighed out individually and then combined, dry, before adding to the primer base. The inhibitor pigment package (see Table I) was added to the primer base in the appropriate proportions and mixed by mechanical stirring. The catalyst component was added just prior to application. Test coupons were pretreated to achieve a water break free surface by first grit blasting, wiping with iso-propanol, rinsing with deionized water, and then drying in air. Test coupons were allowed to dry and cure in air for 7 days prior to testing.

After the curing period, the coupons were scribed using a tungsten carbide scribing tool. The short ends of the coupons were taped, and the coupons were placed in a Q-Fog CCT-600 prohesion chamber for salt fog exposure testing. Salt spray exposure tests were performed for 2000 hours per ASTM B117.

The performance of each coupon was visually evaluated (scribe and field) and documented every 200 hours throughout the 2000-hour exposure. After the 2000-hour test was completed, the coupons were rinsed thoroughly, dried, and visually evaluated. Coupons with shiny metal after 2000 hours were further evaluated under 30-50× magnification. The results after 2000 hours are set forth in Table I and shown in the Figures.

TABLE 1

Rating for coupons after 2000 hours salt spray exposure.

| Formulation | Explanation | 2000-hour rating |
|---|---|---|
| III | Ce(III)-citrate/Zn Molybdate + Zn oxide/SrWO$_4$ | 80-90% shiny metal; slight tarnish film |
| I | Primer without inhibitor | Heavy black deposit; white corrosion product; (1+) rust spot by 600 hours |
| II | SrCrO$_4$ | Shiny metal; 70-80% tarnish film |

Figure 1B:
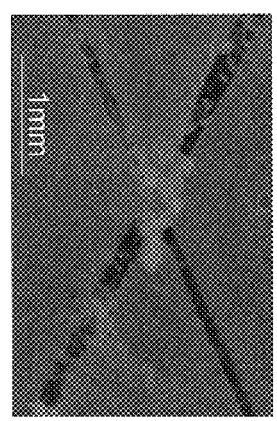
FIG. 1b is a test coupon comprising a metal substrate having the same coating of FIG. 1 without the metal complexing agent in accordance with the present invention.
Figure 1C:
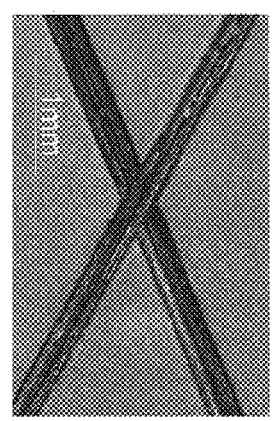
FIG. 1c is a corrosion test coupon comprising a metal substrate having a hexavalent chromium coating.

As can be seen from Table I and FIGS. 1a, 1b, and 1c, the additive of the present invention is effective against corrosion and superior to hexavalent corrosion inhibitors.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A composition comprising:
   an organic carrier selected from the group consisting of adhesives, paints, primers, sealants, epoxies and mixtures thereof; and
   a corrosion inhibiting additive comprising:
   (1) an anodic corrosion inhibitor, selected from the group consisting of transition metal salts;
   (2) a cathodic corrosion inhibitor selected from the group consisting of rare earth metal compounds; and
   (3) a metal complexing agent for improving solubility of the anodic and cathodic corrosion inhibitor, wherein the metal complexing agent is selected from the group consisting of citrate, gluconate, tartrate, β-diketonates, α-hydroxy acids, D-fructose, L-sorbose and mixtures thereof.

2. A according to claim 1, wherein the cathodic corrosion inhibitor is selected from the group consisting of cerous compounds and the anodic corrosion inhibitor is selected from the group consisting of molybdate, tungstate, vanadate and mixtures thereof.

3. A composition according to claims 1 or 2, wherein the metal complexing agent is present in an amount of between 0.1 to 1.0 with respect to the mole fraction of the combined anodic and cathodic corrosion inhibitor.

4. A composition according to claims 1 or 2, wherein the metal complexing agent is present in an amount of between 0.3 to 0.7 with respect to the mole fraction of the combined anodic and cathodic corrosion inhibitor.

5. A composition according to claim 1, wherein at least one anodic and cathodic corrosion inhibitor is present in an amount of at least 0.1 grams/liter and the complexing agent is present in an amount of at least 0.05 grams/liter.

6. A composition according to claim 1, wherein the combined anodic corrosion inhibitor and cathodic corrosion inhibitor is present in an amount between 0.1 to 100 grams/liter, and the metal complexing agent is present in an amount of between 0.05 to 50 grams/liter.

7. An article comprising an aluminum or aluminum alloy metal substrate having a corrosion inhibiting coating comprising a composition according to any one of claims 1 and 2.

8. A composition according to claims 1 or 2, wherein the additive is present in an amount of between about 5 to 12 vol. %, the minimum amount of anodic corrosion inhibitor plus cathodic corrosion inhibitor is at least 1 vol. % and the metal complexing agent is present in at least 0.1 mole fraction of combined inhibitors.

* * * * *

UNITED STATES PATENT AND TRADEMARK OFFICE
CERTIFICATE OF CORRECTION

PATENT NO. : 7,341,677 B2
APPLICATION NO. : 10/611047
DATED : March 11, 2008
INVENTOR(S) : Xiaomei Yu et al.

Page 1 of 1

It is certified that error appears in the above-identified patent and that said Letters Patent is hereby corrected as shown below:

Col. 6 line 53, the word --composition-- should be inserted after "A" and before "according".

Signed and Sealed this

First Day of July, 2008

JON W. DUDAS
*Director of the United States Patent and Trademark Office*